United States Patent
Bhojan

(10) Patent No.: US 7,908,567 B1
(45) Date of Patent: Mar. 15, 2011

(54) METHOD AND SYSTEM FOR NAVIGATING IN A DOCUMENT

(75) Inventor: Narendran Bhojan, Bangalore (IN)

(73) Assignee: Intuit Inc., Mountain View, CA (US)

( * ) Notice: Subject to any disclaimer, the term of this patent is extended or adjusted under 35 U.S.C. 154(b) by 628 days.

(21) Appl. No.: 11/807,017

(22) Filed: May 25, 2007

(51) Int. Cl.
  *G06F 3/00* (2006.01)
(52) U.S. Cl. ......... 715/786; 715/784; 715/711; 715/787
(58) Field of Classification Search .................. 715/787, 715/786, 711
  See application file for complete search history.

(56) References Cited

U.S. PATENT DOCUMENTS

| | | | | |
|---|---|---|---|---|
| 5,757,370 A | * | 5/1998 | Amro et al. | 715/787 |
| 6,147,683 A | * | 11/2000 | Martinez et al. | 715/786 |
| 6,563,514 B1 | * | 5/2003 | Samar | 715/711 |
| 6,590,594 B2 | * | 7/2003 | Bates et al. | 715/784 |
| 7,103,851 B1 | * | 9/2006 | Jaeger | 715/786 |
| 7,181,500 B2 | * | 2/2007 | Jen et al. | 709/217 |
| 2002/0186252 A1 | * | 12/2002 | Himmel et al. | 345/787 |
| 2007/0083823 A1 | * | 4/2007 | Jaeger | 715/787 |

OTHER PUBLICATIONS

Declaration of Annemarie Dahm, signed Jul. 14, 2008, 5 pages.

* cited by examiner

*Primary Examiner* — Dennis Bonshock
(74) *Attorney, Agent, or Firm* — Osha • Liang LLP

(57) ABSTRACT

A method for displaying information about a document in a graphical user interface, that includes receiving an event of a pointer on a trough, identifying a position of the pointer in the trough corresponding to the event, wherein a puck on the trough is in a different position than the position of the pointer, obtaining the location in the document corresponding to the position of the pointer, and displaying a location tip specifying the location in the document.

28 Claims, 7 Drawing Sheets

METHOD AND SYSTEM FOR NAVIGATING IN A DOCUMENT

BACKGROUND

User interfaces provide a mechanism by which a user may communicate with a computer system. One type of user interface is a graphical user interface. A graphical user interface relies on graphical objects, such as bars, buttons, icons, and visual text, to create a graphical representation of information with which a user may interact. For example, a user may instruct the software to save a document by moving an on-screen pointer over a save button and depressing a physical button (e.g., a physical button on a mouse). Alternatively, a user may use the ALT key, TAB key, ENTER key, and/or arrow keys to navigate a graphical file menu, presented to the user via the graphical user interface, and save the document.

A user may also navigate through a document using the graphical user interface. In particular, a user may use a graphical object, such as a scroll bar, to view different portions of the document. A scroll bar is a graphical object that includes a puck that slides across a bar typically located at the edge of a window. The size of the puck and the position of the puck on the trough visually identifies a percentage of the document displayed as well as an approximation of where the portion displayed exists within the document. By moving the puck, a user may navigate to a different portion of the document.

SUMMARY

In general, in one aspect, the invention relates to a method for displaying information about a document in a graphical user interface, that includes receiving an event of a pointer on a trough, identifying a position of the pointer in the trough corresponding to the event, wherein a puck on the trough is in a different position than the position of the pointer, obtaining the location in the document corresponding to the position of the pointer, and displaying a location tip specifying the location in the document.

In general, in one aspect, the invention relates to a method for navigating within a graphical user interface to a location of interest in a document, that includes moving a pointer to a position in a trough, reading a location tip for the position to determine whether the location tip identifies a location of interest in the document, and moving a puck to the position to view the location of interest when the location tip identifies the location of interest in the document, wherein the puck is moved to the position after the location tip is read.

In general, in one aspect, the invention relates to a system for displaying information about a document, that includes a pointer, and a scroll bar for navigating in the document, a graphical user interface configured to receive an event of the pointer on a trough in the scroll bar, identify a position of the pointer in the trough corresponding to the event, wherein a puck on the trough is in a different position than the position of the pointer, obtain the location in the document corresponding to the position of the pointer, and display a location tip specifying the location in the document.

In general, in one aspect, the invention relates to a computer readable medium that includes instructions, which when executed by a processor, to perform a method for navigating within a graphical user interface to a location of interest in a document, the method that includes receiving an event of a pointer on a trough, identifying a position of the pointer in the trough corresponding to the event, wherein a puck on the trough is in a different position than the position of the pointer, obtaining the location in a document corresponding to the position of the pointer, and displaying a location tip specifying the location in the document.

Other aspects of the invention will be apparent from the following description and the appended claims.

DETAILED DESCRIPTION

Figure 1:
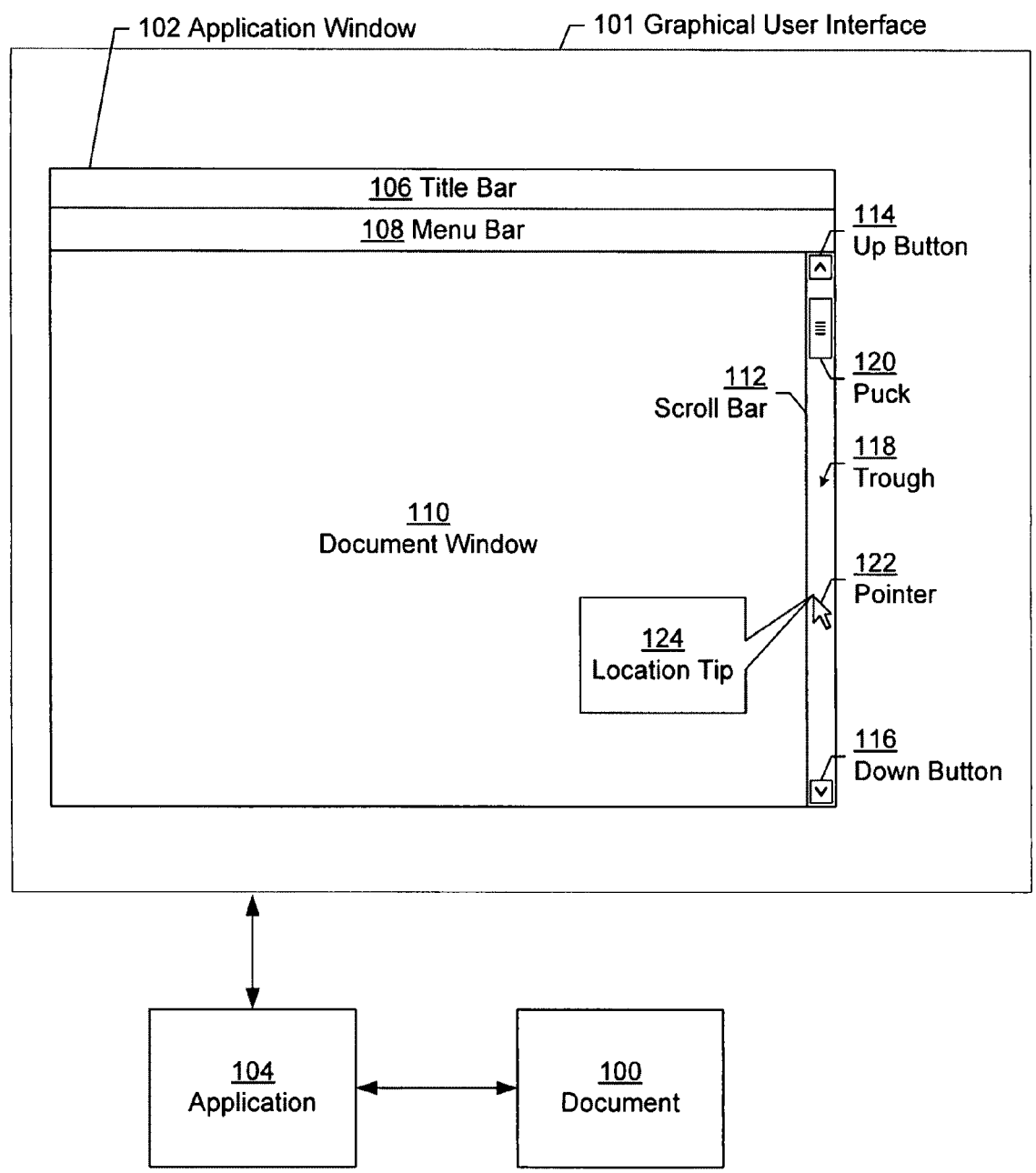
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for navigating within a document. Specifically, embodiments of the invention display a location tip for a position in a scroll bar. In one or more embodiments of the invention, the location tip identifies a location within the document for the corresponding position in the scroll bar. Using the location tip, a user may find the position in the scroll bar and navigate to the location in a document before moving the puck in the scroll bar.

FIG. 1 shows a schematic diagram of a system in accordance with one or more embodiments of the invention. As shown in FIG. 1, the system includes a document (100), an application window (102) within a graphical user interface (101), and an application (104). Each of these components is described below.

In one or more embodiments of the invention, the document (100) is a collection of information. The document (100) may be generated by a user and/or derived from stored information, such as a database. For example, the document (100) may be a generated list, a text file, an Internet-based file, spreadsheet file, or any other collection of information.

In one or more embodiments of the invention, the application (104) includes functionality to display the document and interpret user commands. The application (104) may also include functionality to generate the document. For example, the application (104) may be a word processing application, a web browser, a financial application, a database application, or any other application configured to generate and/or display the document. In one or more embodiments of the invention, the application includes functionality to generate a graphical user interface (101). The graphical user interface (101) may also include functionality to interact with a user via an application window (102).

In one or more embodiments of the invention, the application window (102) is the portion of the graphical user interface (101) that is visible to the user via a display device such as a screen or a monitor. In one or more embodiments of the invention, the application window (102) may include a title bar (106), a menu bar (108), and other such graphical objects as well as a document window (110), a scroll bar (112), and a location tip (124). Each of the above components is described below.

In one or more embodiments of the invention, the title bar (106) may display a name of the application (104), a name of the document (100), or other information identifying the document (100). For example, if the application (104) is a word processing application, then the title bar (106) may display the name of the word processing application as well as a name of the document (100) that the user is accessing. In one or more embodiments of the invention, the menu bar (108) may display commands or menus from which the user may interact with the graphical user interface (101). Specifically, the menu bar (108) may include textual buttons as well as icons. Multiple menu bars (108) may exist depending on the requirements of the application (104). One skilled in the art will appreciate that the title bar (106) and menu bar (108) are optional components of the application window (102).

In one or more embodiments of the invention, the document window (110) displays a portion of the document (100) that is visible to the user. For example, if the document (100) is an alphabetical list of contacts that includes entries from A to Z, then the document window (110) may display only contacts from M to Q. Typically, at a given time, a portion of the document (100) is not visible in the document window (110). In other words, the display window (110) typically cannot display the entire document (100), as such a portion of the document (100) is not visible to the user in the document window (110).

In one or more embodiments of the invention, the document window (110) is adjacent to a scroll bar (112). In one or more embodiments of the invention, the scroll bar (110) includes functionality to graphically identify, for the user, the portion of the document (100) that a user is viewing and receive a command to navigate to a different location. In response to the command, the application (104) navigates to a different location in the document (100). While the scroll bar (112) in FIG. 1 is shown as vertical, the scroll bar (112) may be horizontal and, in such cases, be displayed above or below the document window (110). In another alternative, the scroll bar (112) may be displayed so as to appear perpendicular to the screen to allow a user to view in and out of a document (100) that is displayed in three dimensions. Further, the application window (102) may include multiple scroll bars. For example, both a horizontal and a vertical scroll bar may be simultaneously displayed.

Continuing with FIG. 1, in one or more embodiments of the invention, the scroll bar (112) includes an up button (114), a down button (116), a trough (118), and a puck (120). When the up button (114) or down button (116) is selected, the document window (110) graphically simulates a navigation up or down, respectively, in the document (100). Thus, the user may view a different portion of the document (100) in the document window (110). Similarly, a horizontal scroll bar (not shown) may have a corresponding left button (not shown) and a right button (not shown) to navigate left or right, respectively, in the document (100).

In one or more embodiments of the invention, the puck (120) and the trough (118) identify the portion of the document (100) that is displayed in the document window (110). Specifically, each position in the trough (118) has a corresponding location in the document (100). More specifically, the trough (118) represents a scaled length of a document (100) that is capable of being displayed on the application window (102). For example, the position that is in the middle of the trough (118) corresponds to the location that is in the middle of the document (100). Similarly, a position that is eighty-seven percent of the total trough length from an upper edge of the trough (118) corresponds to a location on the document (100) that is eighty-seven percent of the total document length from the upper edge of the document (100).

In one or more embodiments of the invention, the puck (120) is displayed on the trough (118) and may appear to move along the axis of the trough (118). For example, a vertical scroll bar has a puck (120) that appears to move vertically along the trough (118) and a horizontal scroll bar (not shown) has a puck (120) that appears to move horizontally along the trough. The size of the puck (120) and the position of the puck (120) identify the portion of the document (100) that is displayed with respect to the rest of the document (100). Specifically, a puck (120) covering a position in the trough (118) shows that the location of the document (100) corresponding to the position is viewable in the document window (110). Further, the size of the puck (120) corresponds to the relative amount of the document (100) that is displayed in the document window (110).

Although the scroll bar shown in FIG. 1 has an angular appearance (i.e., all of the components are rectangular), other visualizations of a scroll bar are also possible. For example, the scroll bar may have components with rounded edges, such as bubbles, may be a line with a puck (120) that has a width greater than a line, and/or may use graphical images (e.g., the puck is a race car and the trough is a race car track).

Further, while FIG. 1 shows a single document window (110), multiple document windows may simultaneously exist in the application window (102). Each document window (110) may be used for a separate portion of an application. For example, one document window (110) may display a help file, another document window (110) may display a user's main document, and yet another document window (110) may display a list of contacts. Each document window (110) may have a corresponding scroll bar(s).

In one or more embodiments of the invention, the user may interact with the graphical user interface using the keyboard, keypad, a pointing device (e.g., mouse, stylist, finger, etc.), or any other device capable of interacting with the graphical user interface. Specifically, the user may maneuver a visual pointer (122), which is displayed on the application window (102), using the keyboard. Although FIG. 1 shows the pointer (122) as an arrow, the visualization for the pointer (122) may vary and be configurable according to a user and/or system preference.

In one or more embodiments of the invention, when the pointer (122) is on a position in the trough (118), a location tip (124) is displayed. In one or more embodiments of the invention, the location tip (124) is a textual identifier of the location in the document that corresponds to the position in the trough (118). For example, the location tip (124) may display location information textually corresponding to the position in the document. In one or more embodiments of the invention, the location information unambiguously identifies the location in the document. Specifically, in one or more embodiments of the invention only one contiguous area exists in the document with the location information displayed in the location tip (124).

For example, the location information may include a page number, a line number, a paragraph number, a row or column identifier, a chapter number, title of a section, a heading of a report in a series of reports, an outline level, and any other information which may be used to identify the location in the document or any combination thereof. If a row or column identifier is used, the identifier may identify the location based on an entry at the location. For example, documents which are sorted alphabetically may have a location tip that identifies the location based on the alphabet. The location tip (124) may identify the full name of the entry at the location (e.g., "Agamemnon") or the general identifier of the vicinity of the cell, such as "Aga" rather than "Agamemnon." The above list of location information is only an example of possible location information. The actual location information may vary based on the application, the document, and preferences of the user.

Further, the appearance and the position of the location tip (124) in the application window (102) may vary and may be based on preferences of the user. For example, FIG. 1 shows a location tip (124) in a rectangular callout that is connected to the pointer (122). In use, the location tip (124) may or may not appear connected to the pointer (122). Rather than as a rectangle, the location tip (124) may, for example, appear as a bubble, have rounded edges or appear as a cloud. In another alternative, the location tip (124) may be text in a status bar (not shown) in the application window (102). In one or more embodiments of the invention, the status bar identifies status information about a document.

In one or more embodiments of the invention, the location tip (124) is configurable. Specifically, a configuration profile (not shown) may be stored with the application, which maintains user preferences for the location tip (124). For example, the configuration profile may include preferences for information included in the location information, the position of the location tip (124), the appearance of the location tip (124), and whether or when to display the location tip (124). The configuration profile may be the shared amongst multiple applications. For example, an application suite (not shown) may include functionality to use a configuration profile that is stored in a single file. In such scenario, certain preferences (e.g., the type of location information included in the location tip (124)) may be specific to an application or group of applications while other preferences (e.g., the appearance and position of the location tip (124)) are global to the application suite or for multiple applications in the application suite. Alternatively, each application in the application suite may have a separate file with the configuration profile. Further, the configuration profiles may include user specific information. In such scenarios, the application first locates the correct configuration profile and then locates the portion of the configuration file associated with the user (i.e., the user which is currently using the application).

In another embodiment of the invention, the configuration profiles are maintained on a per-user basis. In such scenarios, the configuration profiles may include information about the preferences for a single application and/or the application suite (or a subset thereof). Further, in this scenario, there may be a global configuration profile, which include a default profile(s) in the event that a user specific configuration profile is not available.

In one or more embodiments of the invention, the configuration profile may use default values until the user requests a change in the configuration profile. Specifically, a user may modify the configuration profile at any stage during the initialization and the use of the application or the application suite in one or more embodiments of the invention. For example, in a scenario in which the application is installed on the user's computer, an installation program may search for preferences on the user's computer or request the preferences from the user. Alternatively, the user may modify default preferences by selecting a button in a tool bar, selecting a menu item or left clicking on the location tip to display a list of preferences that the user may change. The user may identify and update the list the preferences to change using any technique known in the art. When completed, the preferences are updated in the configuration profile and the user may view the location tip according to the updated preferences.

Figure 2:
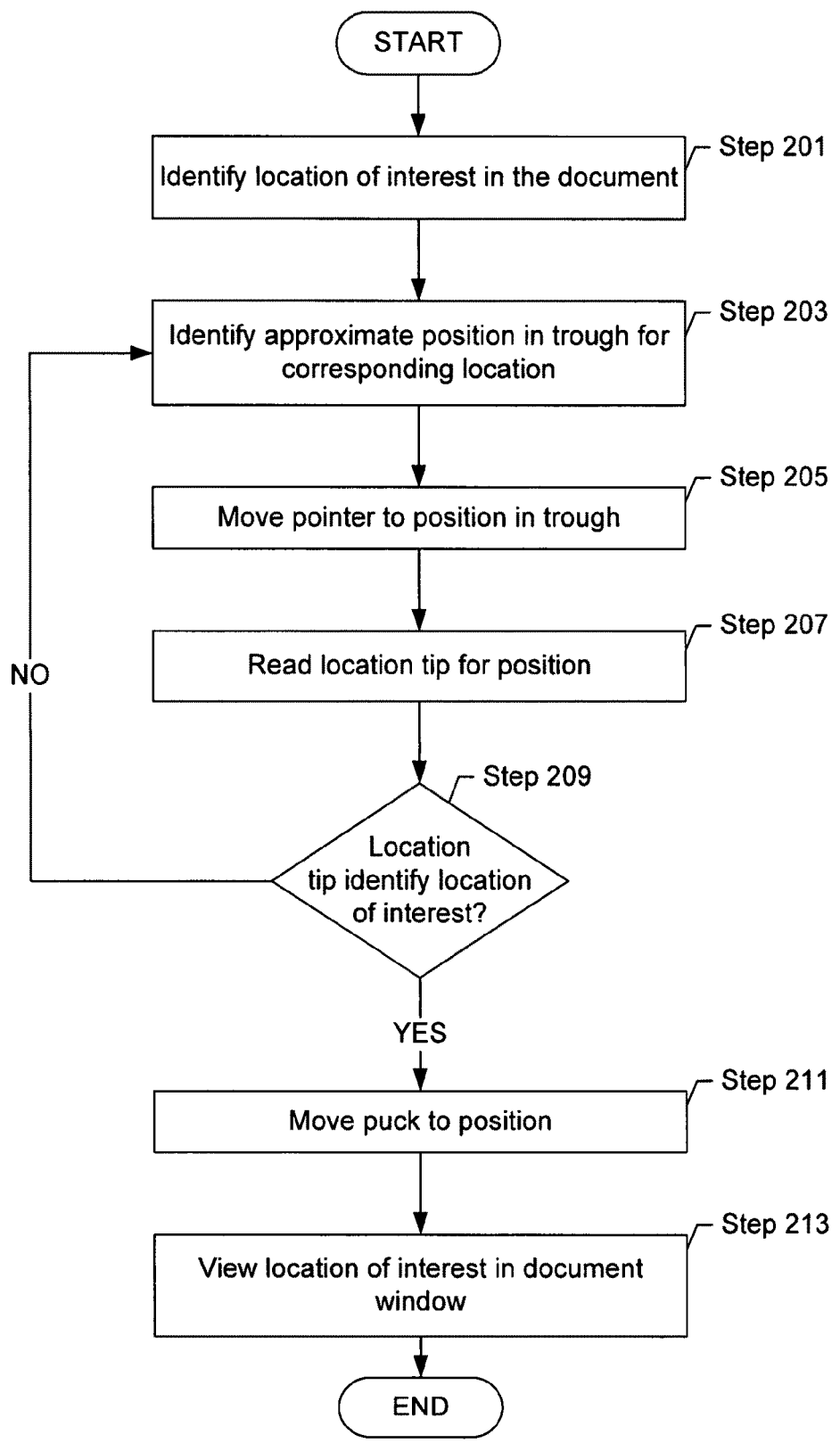
FIGS. 2-3 show flowcharts of a method in accordance with one or more embodiments of the invention.
Figure 3:
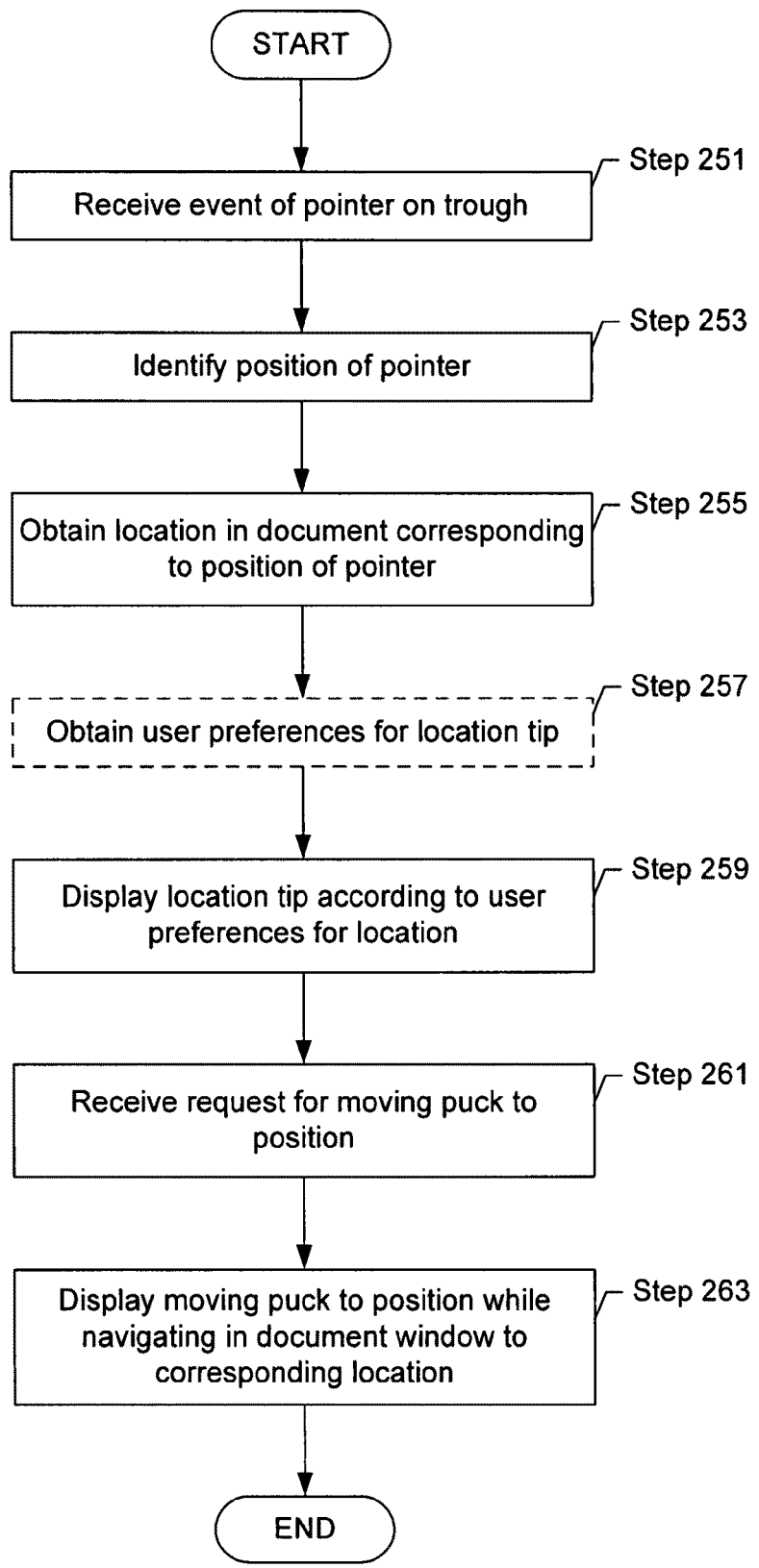

FIGS. 2-3 show flowcharts of a method in accordance with one or more embodiments of the invention. While the various steps in this flowchart are presented and described sequentially, one of ordinary skill will appreciate that some or all of the steps may be executed in different orders and some or all of the steps may be executed in parallel.

FIG. 2 shows a flowchart of a method for a user to use a tool tip in accordance with one or more embodiments of the invention. Initially, the user identifies a location of interest in the document (Step 201). The location of interest is the location in the document that the user would like to view in the document window. For example, if the document is a tax return, then the location of interest may be a specific field in the tax return. Alternatively, if the document is a three dimensional area, then the location of interest may be the degree of zoom in the three dimensional area.

Once the user has identified the location of interest, the user identifies an approximate position in the trough for the location of interest (Step 203). At this stage the user may estimate the approximate position according to knowledge about the document. For example, if the user knows that the document has one hundred and twenty columns that are horizontally adjacent and the location of interest is approximately at the thirtieth column, then the user may identify the approximate position as a fourth from the left side in the trough.

Next, the pointer is moved to the position in the trough (Step 205). In one or more embodiments of the invention, the user does not select the approximate position or move the puck to the approximate position; rather, the user may merely place the pointer over the approximate position with the pointer.

At this stage, a location tip is displayed and the location tip for the position is made available to read (Step 207). While reading the location tip, the user may determine whether the location tip identifies the location of interest (Step 209). Specifically, the user may determine whether the location tip presents location information corresponding to the location of interest. If the location tip does not identify the location of interest, then the user identifies a new approximate position based on the location tip (Step 203).

Alternatively, if the location tip does identify the location of interest, then the puck is moved to the position (Step 211). The puck may be moved into the position using any technique. For example, the user may be selected by, for example, clicking a button on the pointing device when the pointer covers the position, selecting an up button or down button, dragging the puck to the position, use the arrow keys, or page down keys to navigate to the location with the position of the puck as a guide, or perform any other technique to move the puck.

When the puck covers the position, the location of interest of the document is displayed in the document window (Step 213). Accordingly, the user may proceed to read, update, or perform any other act on the location of interest in the document.

FIG. 3 shows a flowchart of a method for an application to assist the user to navigate to the location of interest. Typically, the application performs the method described below using the graphical user interface of the application as shown in FIG. 1, but the invention is not limited that such an implementation.

Initially, an event of a pointer on the trough is received by the application (Step 251). Specifically, the request to move the pointer, such as movement of the pointing device, or request via keyboard, keypad, or other such devices, causes an event to trigger in one or more embodiments of the invention. The event triggers the movement of the pointer on a display. When the application window is active (i.e., the application window is able to receive commands) and the event indicates that the pointer now covers a position in the trough, the application receives an event of the pointer on the trough in accordance with one or more embodiments of the invention.

Based on the event, the position of the pointer on the trough is identified (Step 255). The position that the application identifies may be a relative position that is based on the size of the scroll bar. For example, the position may be in terms of a percentage or ratio from the top, bottom, left, right as compared to the total size of the scroll bar.

Next, the location in the document corresponding to the position of the pointer is obtained (Step 255). Specifically, the application identifies the location in the document. For example, the application may use the total size of the document and the position of the pointer to calculate the location in the document corresponding to the position of the pointer. For example, if the document is three pages long and the position of the pointer is two thirds from the top, then the application may calculate the value resulting from multiplying three by two thirds to determine that the location is at the end of the second page.

Optionally, user preferences for the location tip may be obtained (Step 257). Specifically, the application may access the profile configuration for the user to determine how the user desires the location tip to be displayed. If the user does not have user preferences or if the application does not use the user preferences, then the application may use default values for the user preferences.

The location tip is then displayed according to the user preferences (which may correspond to default values) for the location (Step 259). The application may display the location tip by generating a pop-up with the location information. The location information that is displayed may be determined from the user preferences and/or by using information from the document. For example, if the document is a list of contacts, and the user preferences shows that the location information is the name of the contact at the location, then the application may use the location obtained in Step 255 and the document to determine which contact is at the location in the document. Once the location tip is displayed, the user may determine that the location does not correspond to the location of interest, described above. In such scenario, the process described above starting with Step 251 may repeat.

Continuing with FIG. 3, a request to move the puck to the position is received (Step 261). The request may be an event, such as a selection of a button, the selection and movement of the puck, etc. Accordingly, the application may display moving the puck to the position while navigating in the document window to the corresponding location (Step 263). The movement of the puck and the navigation may appear to the user as instantaneous (i.e., the puck switches positions and the document window in the next display shows the new location). Alternatively, the puck and document window may appear as to scroll to the new position and location, respectively. In another alternative, the document window may show a blank window while the puck appears to scroll to the position. When the puck reaches the location, the document window may display the portion of the document visible at the new location. Thus, the user is able to efficiently and effectively navigate to a different location in the document.

Figure 4A:
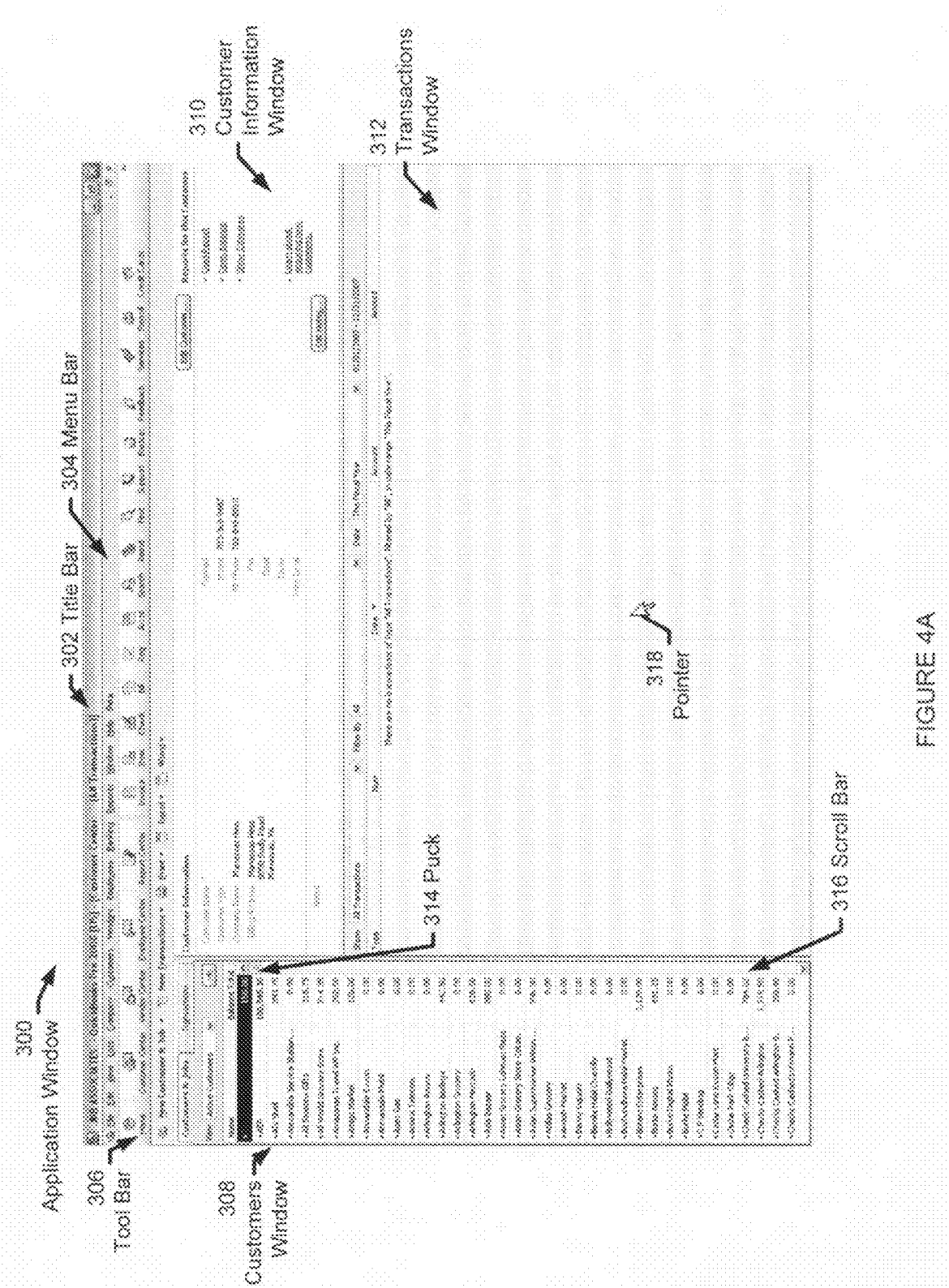
FIGS. 4A-4C show exemplary screenshots in accordance with one or more embodiments of the invention.
Figure 4B:
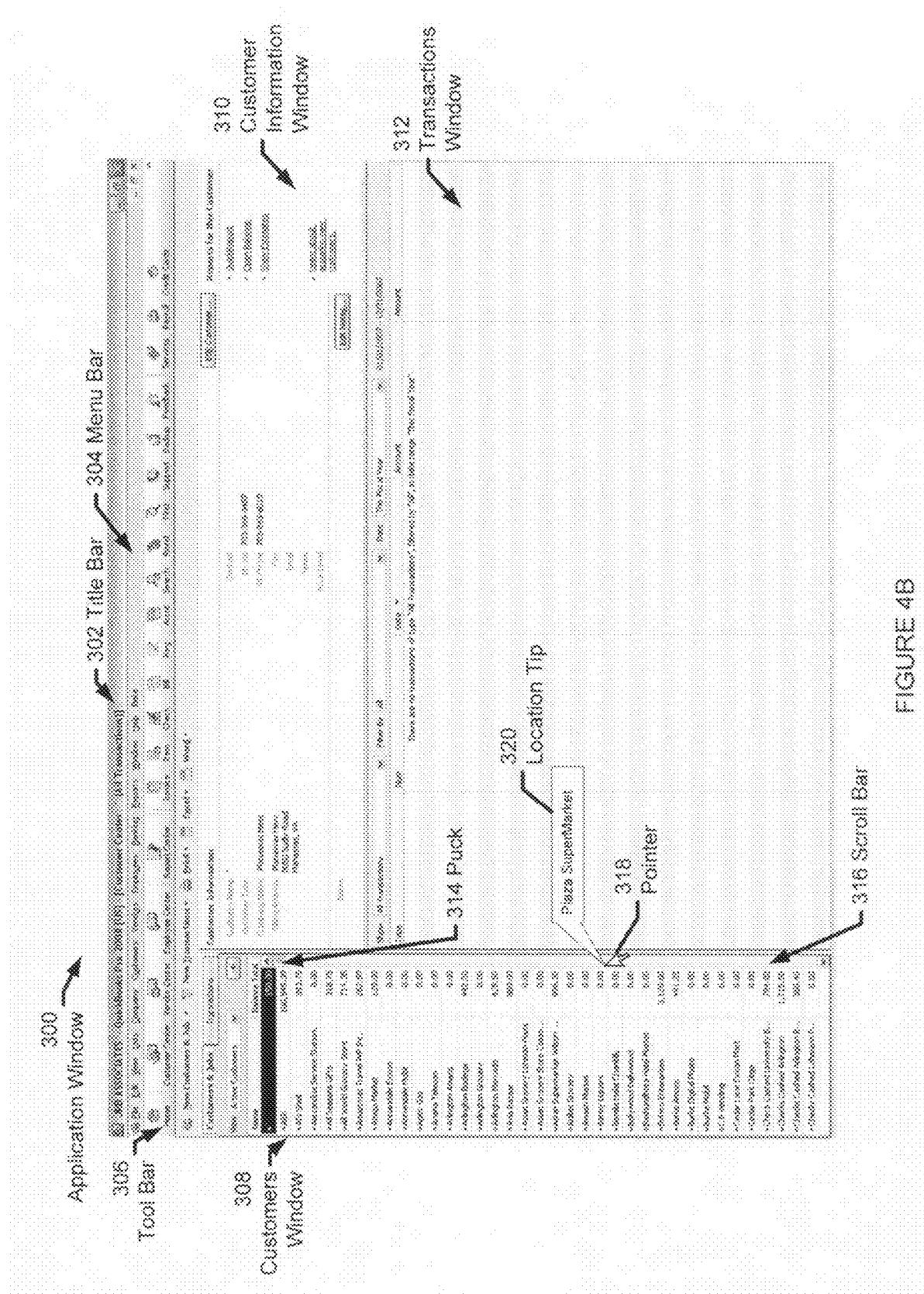
Figure 4C:
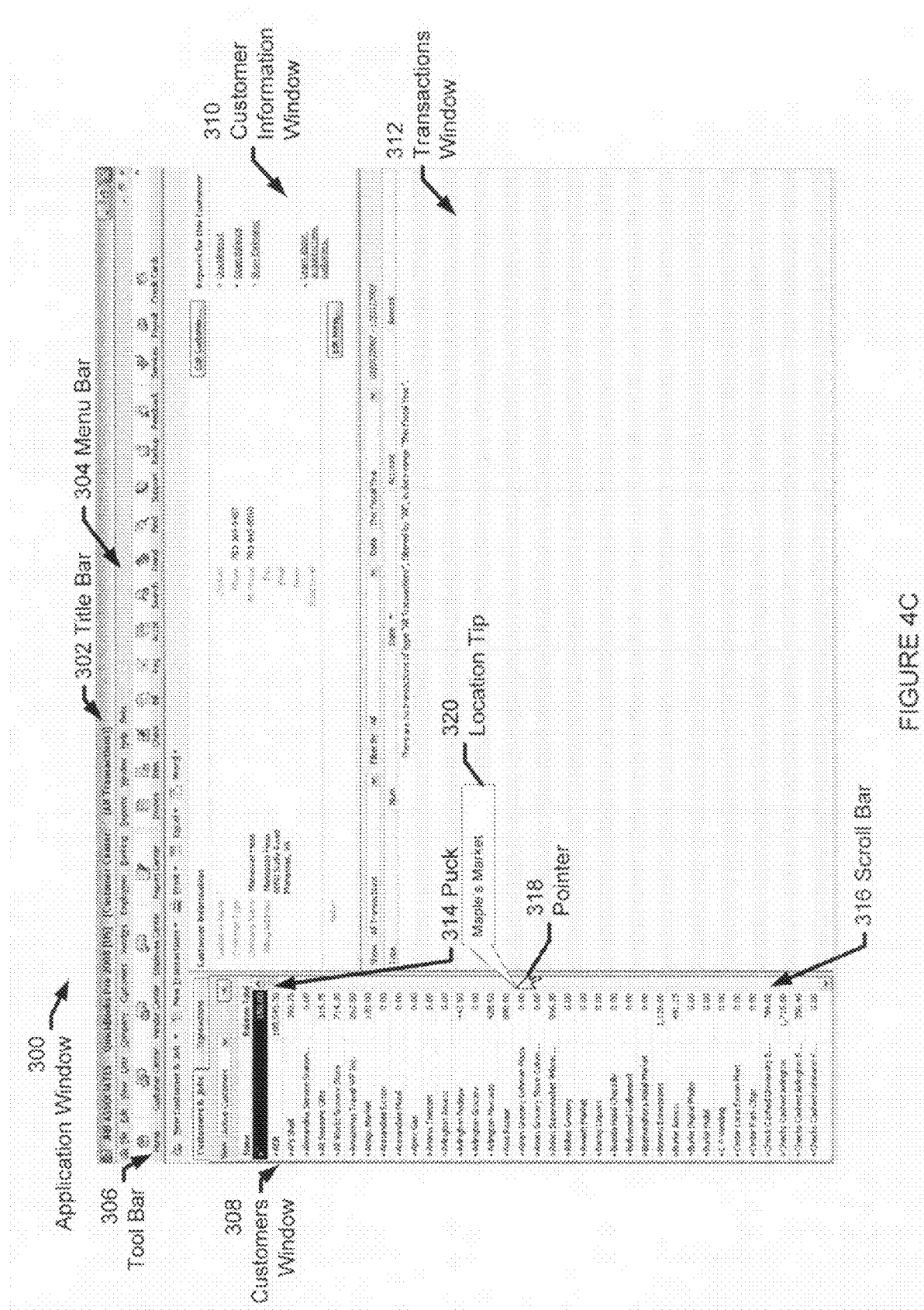

FIGS. 4A-4C show exemplary screenshots in accordance with one or more embodiments of the invention. For the following example, consider the scenario in which the application is QuickBooks® Pro 2008 (US edition), which is developed by and a trademark of Intuit, Inc. located in Mountain View, Calif.

FIG. 4A shows an example application window (300). As shown in FIG. 4A, the application window (300) may have a title bar (302), a menu bar (304), a tool bar (306), document windows (i.e., a customers window (308), a customer information window (310), and a transactions window (312)). The document in the customers window (308) is a list of active customers. The document may be stored as shown in a file or generated by the application when the document is displayed. For example, the list of active customers may be generated when the document is displayed by accessing a customer database. The customer window (308) also includes an attached scroll bar (316) showing that only the top few items in the list are displayed and that the document continues beyond that which is displayed. In one or more embodiments of the invention, a user may interact with the application window (300) using a pointer (318).

Next, consider the scenario in which the user desires the balance total for "Maple's Market." Specifically, the location of interest for the user is the position in the document which shows "Maple's Market." As shown in FIG. 4A, the list of Active customers include only customers from """ with a balance total of $150.00 to "Checks Cached Lohmann P . . . " with a balance total of $0.00. Accordingly, the user needs to scroll to "Maple's Market" in the customers window (308). First, the user estimates the position in the scroll bar that corresponds to the location in the document showing "Maple's Market." Next, the user moves the pointer to the estimated position.

FIG. 4B shows an example in which the pointer (318) covers an estimated position. As shown in FIG. 4B, when the pointer (318) moves over the scroll bar (316), a location tip (320) is displayed. At this stage, the puck (314) and the customers window (308) stay the same. The location tip (320) that is displayed shows that the position corresponds to a location with "Plaza Supermarket." Since "Plaza Supermarket" is not the same as "Maple's Market," the user knows that the estimated position is wrong. Thus, the user estimates a new position for the pointer (318) based on the knowledge of the position for Plaza Supermarket and that the list is alphabetical on customer names. Once the user has estimated a new position, the user may move the pointer (318) to the newly estimated position.

FIG. 4C shows an example screen shot in which the pointer (318) covers the newly estimated position. As shown in FIG. 4C, when the pointer (318) covers the newly estimated position, a location tip (320) is displayed showing that the position covered by the pointer is for the location with "Maple's Market." Accordingly, the user may move the puck (314) to the position and view in the customers window (308) the balance total for "Maple's Market."

Figure 5:
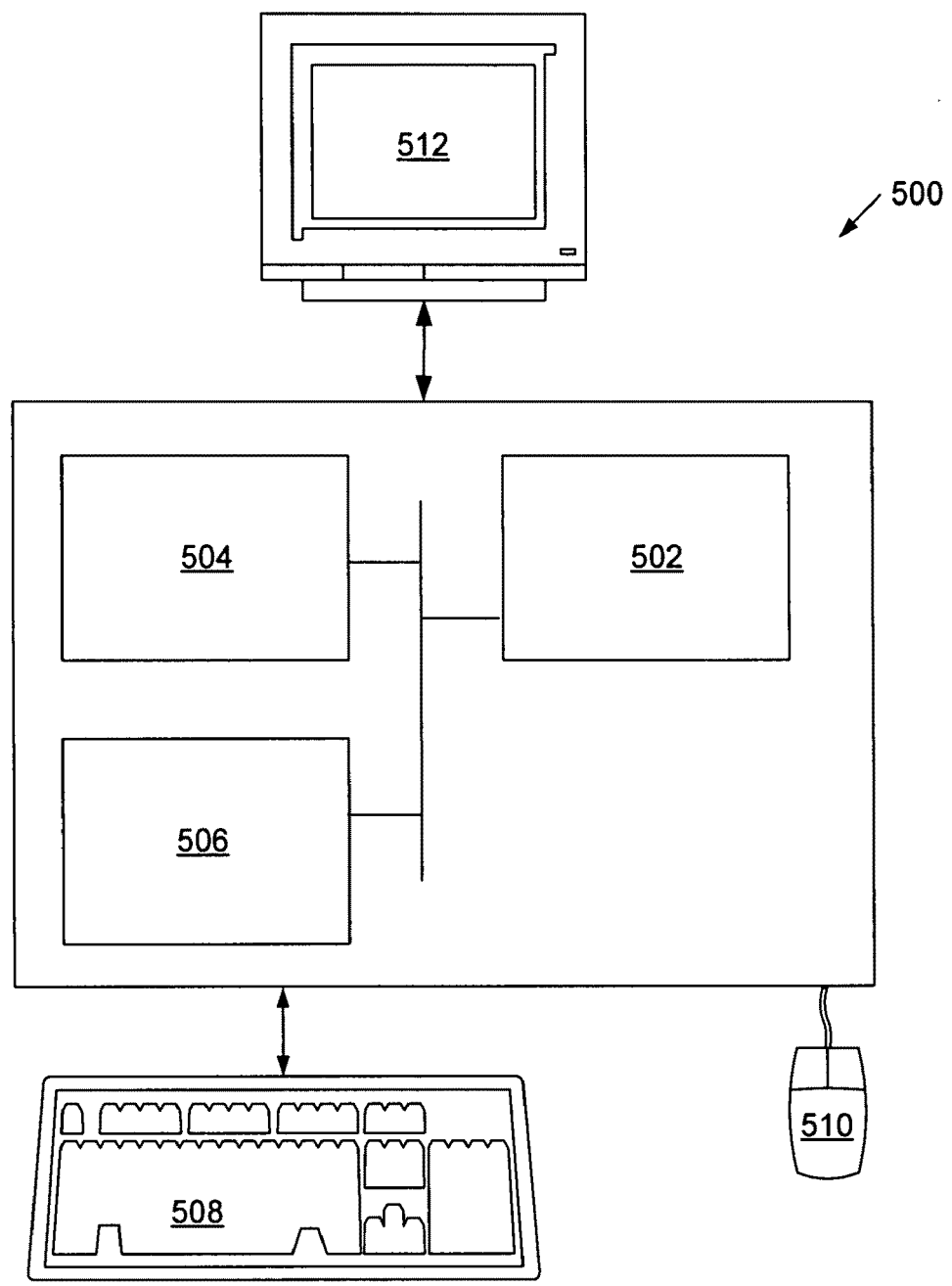
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown).

Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., application, document, display, etc.) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for navigating in a document in a graphical user interface, comprising:
    detecting a pointer hovering on a trough of a scrollbar, wherein a scrollable region of the trough comprises only a puck when the pointer is hovered on the trough;
    identifying a position of the pointer in the trough corresponding to a position of the hovering pointer, wherein the puck on the trough is in a different position than the position of the pointer;
    obtaining a location in the document corresponding to the position of the hovering pointer,
        wherein the document is a tax return, and
        wherein the location is a specific field in the tax return;
    displaying a location tip, without any movement of the puck in the trough, specifying the specific field in the tax return corresponding to the hovering pointer; and
    navigating to the specific field in the tax return based on the location tip.

2. The method of claim 1, further comprising, prior to displaying the location tip:
    obtaining a preference for the location tip, wherein the location tip is displayed according to the preference.

3. The method of claim 2, wherein the preference is for at least one selected from a group consisting of a position of the location tip, an appearance of the location tip, and a type of location information displayed in the location tip.

4. The method of claim 3, wherein the type of location information is at least one selected from a group consisting of a page number, a line number, a paragraph number, a row identifier, a column identifier, a chapter number, a title of a section, a heading of a report in a series of reports, and an outline level.

5. The method of claim 2, wherein the preference is stored in a configuration profile for the user.

6. The method of claim 5, wherein the configuration profile is shared amongst a plurality of applications in an application suite.

7. The method of claim 1, further comprising:
    navigating to the specific field in the tax return while moving the puck to the position of the pointer in the trough.

8. A method for navigating within a graphical user interface to a location of interest in a document, comprising:
    hovering a pointer in a position in a trough of a scrollbar, wherein a scrollable region of the trough comprises only a puck when the hovering pointer is over the position in the trough, wherein the puck on the trough is in a different position than the position of the pointer;
    reading a location tip, without moving the puck in the trough, corresponding to of the position of the hovering pointer to determine whether the location tip identifies a location of interest in the document,
        wherein the document is a tax return, and
        wherein the location of interest displayed by the location tip is a specific field in the tax return; and
    moving the puck to the position to view the specific field of the tax return when the location tip identifies the specific field in the tax return, wherein the puck is moved to the position after the location tip is read.

9. The method of claim 8, further comprising:
    setting a preference for the location tip.

10. The method of claim 9, wherein the preference is for at least one selected from a group consisting of a position of the location tip, an appearance of the location tip, and a type of location information displayed in the location tip.

11. The method of claim 10, wherein the type of location information is at least one selected from a group consisting of a page number, a line number, a paragraph number, a row identifier, a column identifier, a chapter number, a title of a section, a heading of a report in a series of reports, and an outline level.

12. The method of claim 9, wherein the preference is stored in a configuration profile for the user.

13. The method of claim 12, wherein the configuration profile is shared amongst a plurality of applications in an application suite.

14. The method of claim 8, wherein the tax return is displayed in a tax preparation software application.

15. A system comprising a processor for use in navigating in a document, comprising:
    a pointer;
    a scroll bar for navigating in the document; and
    a graphical user interface executing on a processor configured to:
        detect a pointer hovering on a trough of a scrollbar, wherein a scrollable region of the trough comprises only a puck when the pointer is hovered on the trough;
        identify a position of the pointer in the trough corresponding to a position of the hovering pointer, wherein the puck on the trough is in a different position than the position of the pointer;
        obtain a location in the document corresponding to the position of the hovering pointer,
            wherein the document is a tax return, and
            wherein the location is a specific field in the tax return;
        displaying a location tip, without any movement of the puck in the trough, specifying the specific field in the tax return corresponding to the hovering pointer; and
        navigate to the specific field in the tax return based on the location tip.

16. The system of claim 15, wherein the graphical user interface is further configured to obtain a preference for the location tip, wherein the location tip is displayed according to the preference.

17. The system of claim 16, wherein the preference is for at least one selected from a group consisting of a position of the location tip, an appearance of the location tip, and a type of location information displayed in the location tip.

18. The system of claim 17, wherein the type of location information is at least one selected from a group consisting of a page number, a line number, a paragraph number, a row identifier, a column identifier, a chapter number, a title of a section, a heading of a report in a series of reports, and an outline level.

19. The system of claim 16, wherein the preference is stored in a configuration profile for the user.

20. The system of claim 19, wherein the configuration profile is shared amongst a plurality of applications in an application suite.

21. The system of claim 15, wherein the graphical user interface is further configured to:
- navigate to the specific field in the tax return while moving the puck to the position of the pointer in the trough.

22. A non-transitory computer readable medium comprising instructions, which when executed by a processor, to perform a method for navigating within a graphical user interface to a location of interest in a document, the method comprising:
- detecting a pointer hovering on a trough of a scrollbar, wherein a scrollable region of the trough comprises only a puck when the pointer is hovered on the trough;
- identifying a position of the pointer in the trough corresponding to a position of the hovering pointer, wherein the puck on the trough is in a different position than the position of the pointer;
- obtaining a location in the document corresponding to the position of the hovering pointer,
  - wherein the document is a tax return, and
  - wherein the location is a specific field in the tax return;
- displaying a location tip, without any movement of the puck in the trough, specifying the specific field in the tax return corresponding to the hovering pointer; and
- navigating to the specific field in the tax return based on the location tip.

23. The non-transitory computer readable medium of claim 22, wherein the method further comprises:
- obtaining a preference for the location tip, wherein the location tip is displayed according to the preference.

24. The non-transitory computer readable medium of claim 23, wherein the preference is for at least one selected from a group consisting of a position of the location tip, an appearance of the location tip, and a type of location information displayed in the location tip.

25. The non-transitory computer readable medium of claim 24, wherein the type of location information is at least one selected from a group consisting of a page number, a line number, a paragraph number, a row identifier, a column identifier, a chapter number, a title of a section, a heading of a report in a series of reports, and an outline level.

26. The non-transitory computer readable medium of claim 23, wherein the preference is stored in a configuration profile for the user.

27. The non-transitory computer readable medium of claim 26, wherein the configuration profile is shared amongst a plurality of applications in an application suite.

28. The non-transitory computer readable medium of claim 22, wherein the method further comprises instructions for:
- navigating to the specific field of the tax return while moving the puck to the position of the pointer in the trough.

\* \* \* \* \*

UNITED STATES PATENT AND TRADEMARK OFFICE
CERTIFICATE OF CORRECTION

| | |
|---|---|
| PATENT NO. | : 7,908,567 B1 |
| APPLICATION NO. | : 11/807017 |
| DATED | : March 15, 2011 |
| INVENTOR(S) | : Narendran Bhojan |

Page 1 of 1

It is certified that error appears in the above-identified patent and that said Letters Patent is hereby corrected as shown below:

In Claim 15, Column 10 (line 55) "displaying" should read as --display--.

Signed and Sealed this
Tenth Day of May, 2011

David J. Kappos
*Director of the United States Patent and Trademark Office*